US012734823B2

(12) United States Patent
Stanich et al.

(10) Patent No.: US 12,734,823 B2
(45) Date of Patent: Sep. 15, 2026

(54) MECHANISM FOR GENERATING SUB RANGE TRANSFER FUNCTIONS

(71) Applicants: Mikel Stanich, Boulder, CO (US); Scott R. Johnson, Boulder, CO (US); James Chauvin, Boulder, CO (US); Pallavi Premkumar, Boulder, CO (US)

(72) Inventors: Mikel Stanich, Boulder, CO (US); Scott R. Johnson, Boulder, CO (US); James Chauvin, Boulder, CO (US); Pallavi Premkumar, Boulder, CO (US)

(73) Assignee: RICOH COMPANY, LTD., Tokyo (JP)

( * ) Notice: Subject to any disclaimer, the term of this patent is extended or adjusted under 35 U.S.C. 154(b) by 255 days.

(21) Appl. No.: 18/594,974

(22) Filed: Mar. 4, 2024

(65) Prior Publication Data

US 2025/0276532 A1 Sep. 4, 2025

(51) Int. Cl.
*B41J 2/205* (2006.01)
*B41J 2/21* (2006.01)
*B41J 29/393* (2006.01)

(52) U.S. Cl.
CPC ........... *B41J 2/2132* (2013.01); *B41J 2/2056* (2013.01); *B41J 29/393* (2013.01)

(58) Field of Classification Search
None
See application file for complete search history.

(56) References Cited

U.S. PATENT DOCUMENTS 4,436,439 A 3/1984 Koto
6,154,227 A 11/2000 Lund
6,290,321 B1 9/2001 Murray
6,641,053 B1 11/2003 Breidenbach
7,110,144 B2 9/2006 Cheng et al.
7,286,266 B2 10/2007 Fujita
7,835,043 B2 11/2010 Gila
7,980,650 B2 7/2011 Zhang
(Continued)

FOREIGN PATENT DOCUMENTS

JP H08289148 * 11/1996 ............. H04N 1/407
JP 2003066659 * 3/2003 ............. G03G 15/00
(Continued)

OTHER PUBLICATIONS

Office Action for U.S. Appl. No. 18/476,566, mailed Jun. 25, 2024, 11 pages.

(Continued)

*Primary Examiner* — Beniyam Menberu
(74) *Attorney, Agent, or Firm* — Jaffery Watson Hamilton & DeSanctis LLP

(57) ABSTRACT

A printing system is disclosed. The printing system includes at least one physical memory device to store calibration logic and one or more processors coupled with the at least one physical memory device to execute the calibration logic to receive operating point data corresponding to an image processing system, receive a full range transfer function corresponding to an image processing system and generate a sub range transfer function corresponding to the image processing system for each of a plurality of digital count values based on the operating point data and the full range transfer function.

20 Claims, 13 Drawing Sheets

(56) References Cited

U.S. PATENT DOCUMENTS

| | | | | |
|---|---|---|---|---|
| 7,986,435 | B2 | 7/2011 | Shimbaru | |
| 7,986,447 | B2 | 7/2011 | Bang et al. | |
| 8,049,939 | B2 | 11/2011 | Wilms et al. | |
| 8,254,000 | B2 | 8/2012 | Roscoe | |
| 8,305,644 | B2 | 11/2012 | Nakamura | |
| 8,322,811 | B2 | 12/2012 | Chandu et al. | |
| 8,454,116 | B2 | 6/2013 | Asauchi | |
| 8,511,776 | B2 | 8/2013 | Tuttnauer | |
| 8,953,219 | B2 | 2/2015 | Hallam | |
| 9,056,486 | B1 | 6/2015 | Bansyo | |
| 9,070,076 | B1 | 6/2015 | Smith | |
| 9,383,706 | B2 | 7/2016 | Tamura | |
| 9,641,726 | B1 | 5/2017 | Schweid | |
| 9,684,272 | B2 | 6/2017 | Saito | |
| 10,015,368 | B2 | 7/2018 | Kishi | |
| 10,038,824 | B1 | 7/2018 | Das | |
| 10,150,301 | B2 | 12/2018 | Inagawa | |
| 10,277,775 | B2 | 4/2019 | Kirchhoff | |
| 10,379,790 | B2 | 8/2019 | Amit | |
| 10,538,104 | B2 | 1/2020 | Mayer | |
| 10,596,808 | B2 | 3/2020 | Trachanas | |
| 11,155,077 | B2 | 10/2021 | Kollata | |
| 11,155,099 | B2 | 10/2021 | Stanich | |
| 11,216,710 | B1 | 1/2022 | Stanich et al. | |
| 11,283,936 | B1 | 3/2022 | Stanich | |
| 11,338,591 | B1 | 5/2022 | Kailey | |
| 11,351,802 | B2 | 6/2022 | Wang | |
| 11,368,592 | B1 | 6/2022 | Kailey | |
| 11,415,462 | B2 | 8/2022 | Morovic | |
| 11,443,152 | B1 | 9/2022 | Stanich et al. | |
| 11,481,162 | B1 | 10/2022 | Rao et al. | |
| 11,630,975 | B1 * | 4/2023 | Terrab | G03G 15/0105 358/1.4 |
| 11,632,487 | B1 * | 4/2023 | Terrab | H04N 1/00034 358/1.9 |
| 11,922,241 | B1 | 3/2024 | Stanich | |
| 2005/0122361 | A1 | 6/2005 | Huang | |
| 2008/0151276 | A1 | 6/2008 | Mori | |
| 2012/0300232 | A1 | 11/2012 | Kouguchi | |
| 2014/0316841 | A1 | 10/2014 | Kilby | |
| 2015/0298153 | A1 | 10/2015 | Baker | |
| 2015/0356381 | A1 | 12/2015 | Choulet | |
| 2015/0373305 | A1 | 12/2015 | Hauf | |
| 2022/0286578 | A1 * | 9/2022 | Stanich | H04N 1/405 |
| 2022/0294932 | A1 | 9/2022 | Morales | |
| 2023/0012070 | A1 | 1/2023 | Ogasahara | |
| 2023/0012395 | A1 | 1/2023 | Wakana | |

FOREIGN PATENT DOCUMENTS

| | | | |
|---|---|---|---|
| JP | 2004309662 | A | 11/2004 |
| JP | 4492789 | B2 | 6/2010 |
| JP | 2010228339 | A | 10/2010 |
| JP | 4604733 | B2 | 1/2011 |
| JP | 4844594 | B2 | 12/2011 |
| JP | 5043513 | B2 | 10/2012 |
| JP | 5391930 | B2 | 1/2014 |
| JP | 5409250 | B2 | 2/2014 |
| JP | 2014235234 | A | 12/2014 |
| JP | 5743528 | B2 | 7/2015 |
| JP | 6040763 | B2 | 12/2016 |
| JP | 6123865 | A | 5/2017 |
| JP | 6178708 | B2 | 8/2017 |
| JP | 6282145 | B2 | 2/2018 |
| JP | 6311888 | B2 | 4/2018 |
| JP | 6365669 | A | 8/2018 |
| JP | 6410978 | B1 | 11/2018 |
| JP | 6566052 | B2 | 8/2019 |
| JP | 6569869 | B2 | 9/2019 |
| JP | 6688627 | B2 | 4/2020 |
| JP | 6729091 | B2 | 7/2020 |
| JP | 6827307 | B2 | 2/2021 |
| JP | 2021086049 | A | 6/2021 |
| JP | 6985017 | B2 | 11/2021 |
| JP | 2022014744 | A | 1/2022 |
| JP | 7050532 | B2 | 4/2022 |
| JP | 2022102896 | A | 7/2022 |
| JP | 2022136042 | A | 9/2022 |
| JP | 7151212 | B2 | 10/2022 |
| JP | 7211648 | B2 | 1/2023 |
| JP | 2023009770 | A | 1/2023 |
| JP | 2023009932 | A | 1/2023 |
| JP | 7049715 | B1 | 2/2023 |
| JP | 2023052181 | A | 4/2023 |
| WO | 2012027100 | A1 | 3/2012 |

OTHER PUBLICATIONS

Study on Modulation Transfer Function and Optical Characteristics of Printing Paper, downloaded from https://ieeexplore.ieee.org/document/4723285, published Dec. 22, 2008, 3 pages.

Office Action for U.S. Appl. No. 18/182,932, mailed Sep. 14, 2023, 7 pages.

Notice of Allowance for U.S. Appl. No. 18/182,932, mailed Nov. 2, 2023, 10 pages.

Notice of Reasons for Refusal for JP Application No. 2025-030963 mailed Feb. 16, 2026, 8 pages.

* cited by examiner

530

| K – Digital Count | K – L* | K – a* | K – b* | K – PD knockdown | K – DE 2000 | K – OD | K – Full range TF |
|---|---|---|---|---|---|---|---|
| 0 | 93.05171 | 0.912821 | -1.7215 | 100 | 88.9892233 | 0.063775 | 0 |
| 1 | 91.59351 | 0.930802 | -1.59418 | 99.60784314 | 86.7752016 | 0.084721 | 29 |
| 2 | 90.13751 | 0.949076 | -1.46605 | 99.21568627 | 84.4919153 | 0.105683 | 58 |
| 3 | 88.68379 | 0.967652 | -1.33715 | 98.82352941 | 82.1938847 | 0.126661 | 87 |
| 4 | 87.23236 | 0.986523 | -1.20751 | 98.43137255 | 79.9148507 | 0.147654 | 116 |
| 5 | 85.78314 | 1.00568 | -1.0772 | 98.03921569 | 77.6734793 | 0.168663 | 145 |
| 6 | 84.33601 | 1.025103 | -0.94631 | 97.64705882 | 75.4789163 | 0.189688 | 174 |
| 7 | 82.89085 | 1.04477 | -0.81493 | 97.25490196 | 73.3347881 | 0.210729 | 203 |
| 8 | 81.4475 | .064657 | -0.68313 | 96.8627451 | 71.2417176 | 0.231786 | 232 |
| 9 | 80.00585 | 1.084734 | -0.55102 | 96.47058824 | 69.1987912 | 0.252857 | 261 |
| 10 | 78.56579 | 1.104975 | -0.41864 | 96.07843137 | 67.2043748 | 0.273942 | 290 |
| 11 | 77.12724 | 1.12535 | -0.28607 | 95.68627451 | 65.2565541 | 0.29504 | 319 |
| 12 | 75.69014 | 1.145833 | -0.15334 | 95.29411765 | 63.3533646 | 0.316147 | 348 |
| 13 | 74.25444 | 1.166397 | -0.02046 | 94.90196078 | 61.4929042 | 0.337263 | 377 |
| 14 | 72.82014 | 1.187017 | 0.112584 | 94.50980392 | 59.6733864 | 0.358384 | 406 |
| 15 | 71.38724 | 1.207677 | 0.245895 | 94.11764706 | 57.893188 | 0.379509 | 435 |
| 16 | 69.95595 | 1.228388 | 0.379703 | 93.7254902 | 56.1510028 | 0.400634 | 464 |
| 17 | 68.52714 | 1.249259 | 0.514621 | 93.33333333 | 54.446455 | 0.421762 | 493 |
| 18 | 67.10413 | 1.270717 | 0.652206 | 92.94117647 | 52.7820437 | 0.442908 | 522 |

Figure 8

MECHANISM FOR GENERATING SUB RANGE TRANSFER FUNCTIONS

FIELD OF THE INVENTION

The invention relates to the field of image reproduction, and in particular, to printer calibration.

BACKGROUND

Entities with substantial printing demands typically implement a high-speed production printer for volume printing (e.g., one hundred pages per minute or more). Production printers may include continuous-forms printers that print on a web of print media (or paper) stored on a large roll. A production printer typically includes a localized print controller that controls the overall operation of the printing system, and a one or more print engines that includes one or more printhead assemblies, where each assembly includes a printhead controller and a printhead (or array of printheads). Each printhead contains many nozzles (e.g., inkjet nozzles) for the ejection of ink or any colorant suitable for printing on a medium.

SUMMARY

In one embodiment, a printing system is disclosed. The printing system includes at least one physical memory device to store calibration logic and one or more processors coupled with the at least one physical memory device to execute the calibration logic to receive operating point data corresponding to an image processing system, receive a full range transfer function corresponding to an image processing system and generate a sub range transfer function corresponding to the image processing system for each of a plurality of digital count values based on the operating point data and the full range transfer function.

BRIEF DESCRIPTION OF THE DRAWINGS

A better understanding of the present invention can be obtained from the following detailed description in conjunction with the following drawings, in which:

FIG. 8 illustrates one embodiment of a full range transfer function lookup table;

DETAILED DESCRIPTION

Optical Density (OD) of production printers changes over time as components experience wear. For example, OD increases in an ink jet printer as drop sizes increase due to the wear of printhead components. This change in performance is undesirable because it impacts the consistency of color management. One approach to maintaining consistency is to recalibrate each primary color to a specific target OD using a customer's substrate (e.g., paper). However, having to perform recalibration for a substrate when a new OD target is desired is a time consuming process.

According to one embodiment, a printer calibration mechanism implementing a single calibration for a substrate is described. In such an embodiment, the calibration enables a determination of transfer functions for targets that are different than an original calibration target. In the following description, for the purposes of explanation, numerous specific details are set forth to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
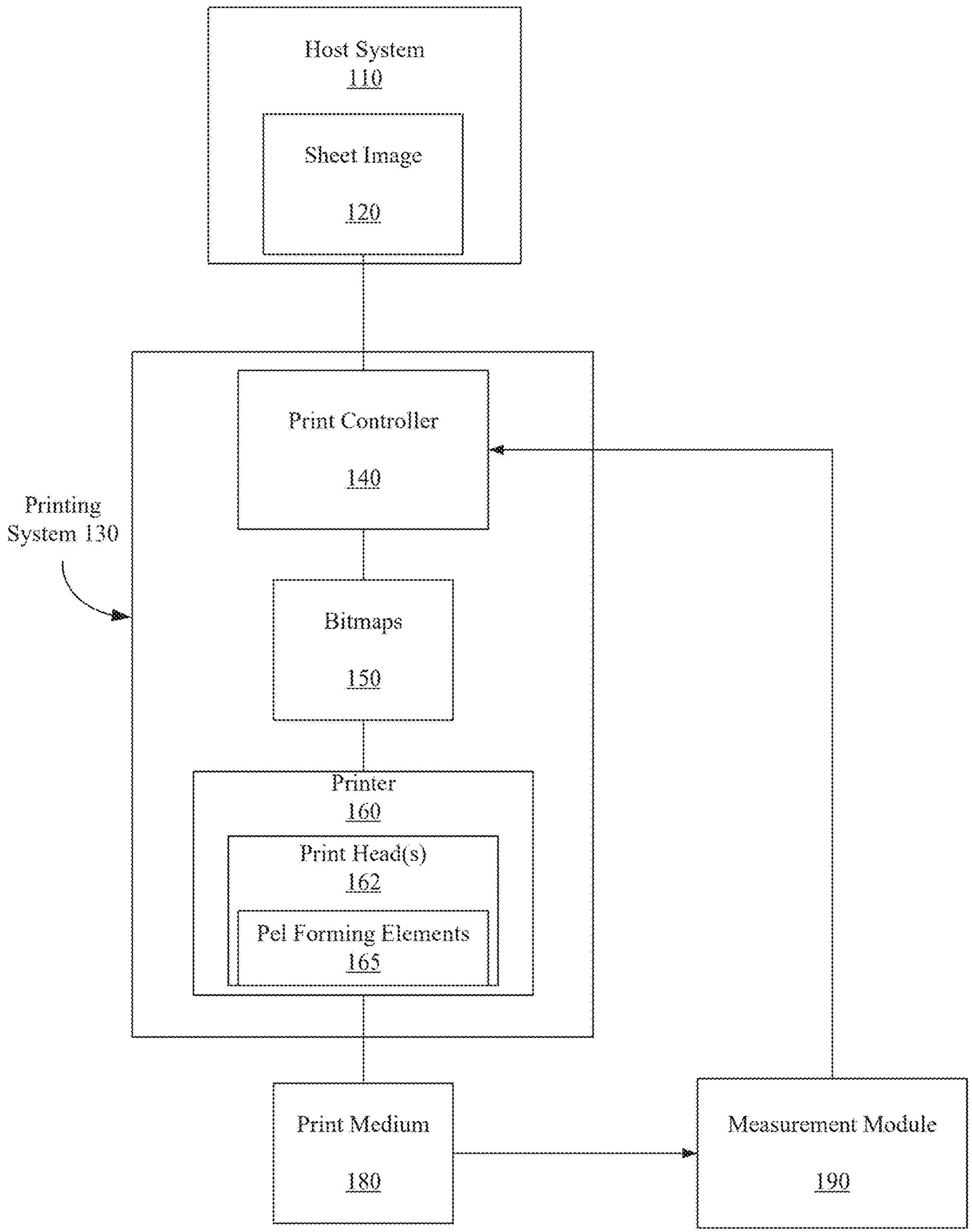
FIG. 1 is a block diagram of one embodiment of a printing system.

FIG. 1 is a block diagram illustrating one embodiment of a printing system 130. A host system 110 is in communication with the printing system 130 to print a sheet image 120 onto a print medium 180 via a printer 160 (e.g., one or more print engines). Print medium 180 may include paper, card stock, paper board, corrugated fiberboard, film, plastic, synthetic, textile, glass, composite or any other tangible medium (e.g., a print substrate) suitable for printing. The format of print medium 180 may be continuous form or cut sheet or any other format suitable for printing. Printer 160 may be an ink jet, electrophotographic or another suitable printer type.

In one embodiment, printer 160 comprises one or more printheads 162, each including one or more pel forming elements 165 that directly or indirectly (e.g., by transfer of marking material through an intermediary) forms the representation of picture elements (pels) on the print medium 180 with marking material applied to the print medium. In an ink jet printer, the pel forming element 165 is a tangible device that ejects the ink onto the print medium 180 (e.g., an ink jet nozzle) and, in an electro-photographic (EP) printer the pel forming element may be a tangible device that determines the location of toner particles printed on the print medium (e.g., an EP exposure LED or an EP exposure laser). The pel forming elements may be grouped onto one or more printheads 162. The pel forming elements 165 may be stationary (e.g., as part of a stationary printhead 162) or moving (e.g., as part of a printhead 162 that moves across the print medium 180) as a matter of design choice. The pel forming elements 165 may be assigned to one of one or more color planes that correspond to each of one or more types of marking materials (e.g., primary colors Cyan, Magenta, Yellow, and Black (CMYK)).

In a further embodiment, printer 160 is a multi-pass printer (e.g., dual pass, 3 pass, 4 pass, etc.) wherein multiple sets of pel forming elements 165 print the same region of the print image on the print medium 180. The set of pel forming elements 165 may be located on the same physical structure (e.g., an array of nozzles on an ink jet print head 162) or separate physical structures. The resulting print medium 180 may be printed in color and/or in any of a number of gray shades, including black and white (e.g., Cyan, Magenta, Yellow, and Black, (CMYK)). The host system 110 may include any computing device, such as a personal computer, a server, or even a digital imaging device, such as a digital camera or a scanner.

The sheet image 120 may be any file or data that describes how an image on a sheet of print medium 180 should be printed. For example, the sheet image 120 may include PostScript data, Printer Command Language (PCL) data, and/or any other printer language data. The print controller 140 processes the sheet image to generate a bitmap 150 for transmission. The bitmap 150 includes the instructions (e.g., instructed ink drop size and/or instructed pel forming element location) for the one or more printheads 162 and pel forming elements 165. Bitmap 150 may be a halftoned bitmap (e.g., a compensated halftone bit map generated from compensated halftones, or uncompensated halftone bit map generated from uncompensated halftones) for printing to the print medium 180. The printing system 130 may be a high-speed printer operable to print high volumes (e.g., greater than 100 pages per minute).

The print medium 180 may be continuous form paper, cut sheet paper, and/or any other tangible medium suitable for printing. The printing system 130, in one generalized form, includes the printer 160 that presents the bitmap 150 onto the print medium 180 (e.g., via toner, ink, etc.) based on the sheet image 120. Although shown as a component of printing system 130, other embodiments may feature printer 160 as an independent device communicably coupled to print controller 140.

The print controller 140 may be any system, device, software, circuitry and/or other suitable component operable to transform the sheet image 120 for generating the bitmap 150 in accordance with printing onto the print medium 180. In this regard, the print controller 140 may include processing and data storage capabilities. In one embodiment, measurement module 190 is implemented as part of a compensation system to obtain measurements of the printed medium 180. The measured results are communicated to print controller 140 to be used in a compensation process. The measurement system may be a stand-alone process or be integrated into the printing system 130.

According to one embodiment, measurement module 190 may be an image sensor to take measurements of printed images on print medium 180. Measurement module 190 may generate and transmit measurement data. Measurement data may be OD (e.g., optical density), perceptual lightness (e.g., L* in the CIELAB color plane L*a*b*) and/or scanned image (e.g., RGB) data corresponding to a printed image. In one embodiment, measurement module 190 may comprise one or more sensors that each or in total take measurements for printed markings produced for some or all pel forming elements 165. In another embodiment, measurement module 190 may be a camera system, in-line scanner, densitometer or spectrophotometer.

Figure 2A:
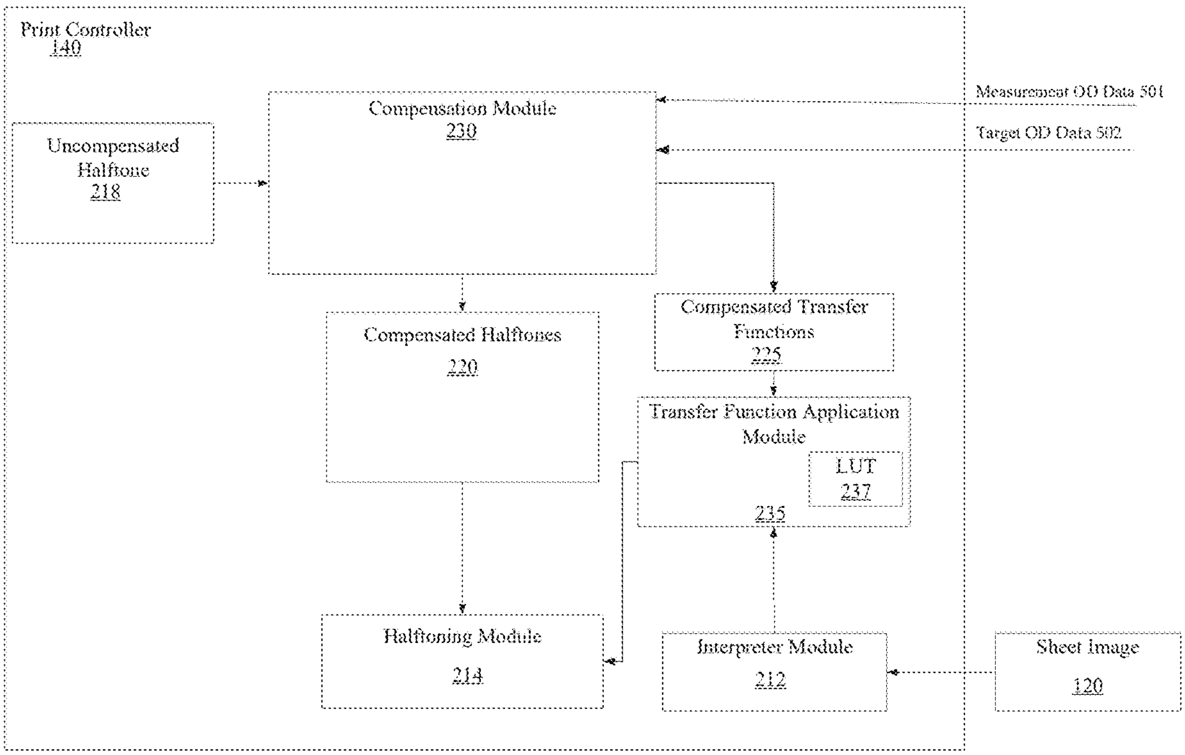
FIGS. 2A&2B are block diagrams illustrating embodiment of a print controller.
Figure 2B:
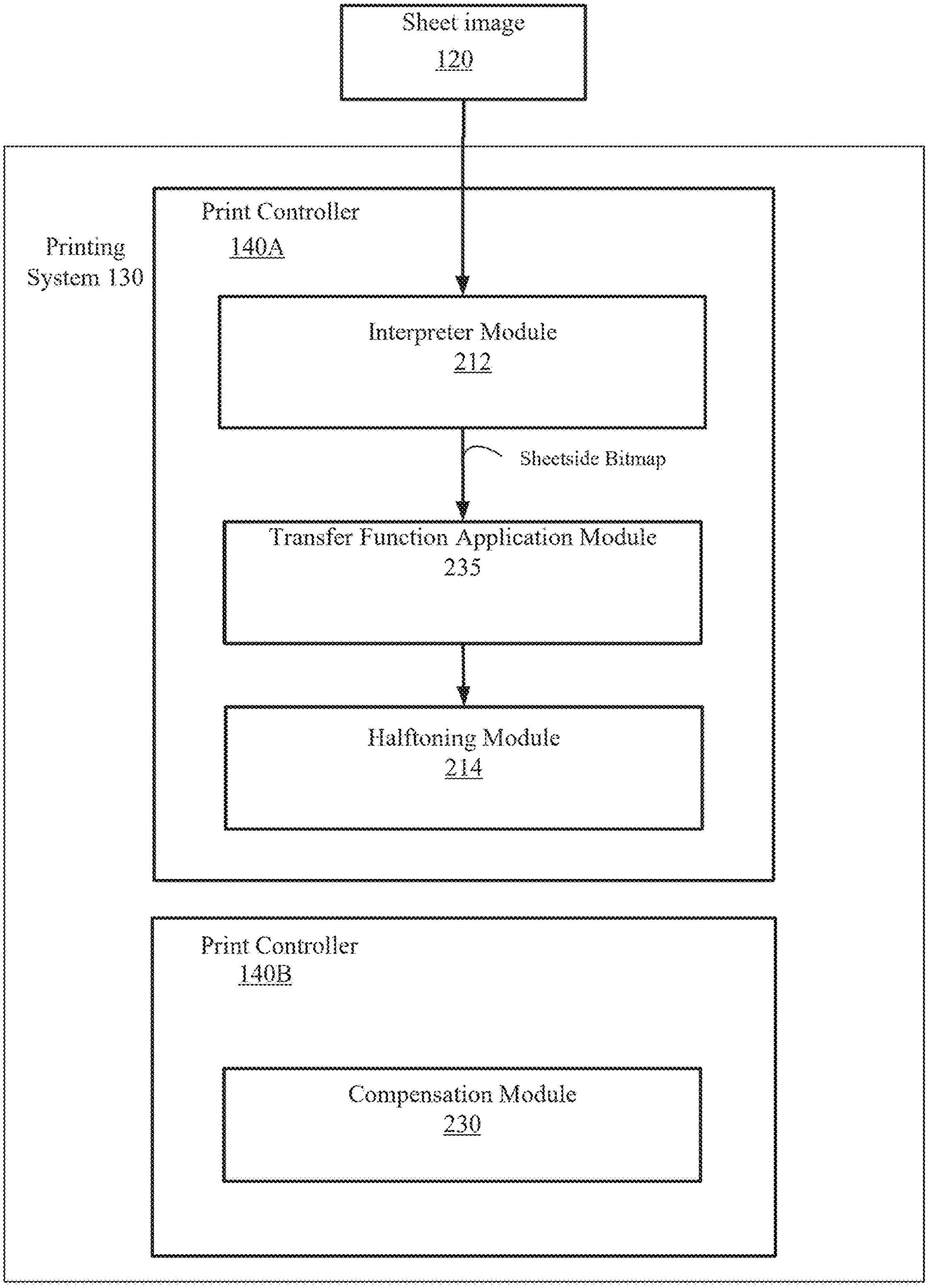

FIG. 2A illustrates a print controller 140 (e.g., DFE or digital front end), in its generalized form, including interpreter module 212, halftoning module 214 and compensation module 230. These separate components may represent hardware used to implement the print controller 140. Alternatively, or additionally, the separate components may represent logical blocks implemented by executing software instructions in a processor of the printer controller 140. FIG. 2B illustrates an alternative embodiment having print controllers 140A&140B. In this embodiment, print controller 140A includes interpreter module 212 and halftoning module 214, and print controller 140B includes compensation module 230. Print controllers 140A and 140B may be implemented in the same printing system 130 (as shown) or may be implemented separately.

The interpreter module 212 is operable to interpret, render, rasterize, or otherwise convert images (e.g., raw sheetside images such as sheet image 120) of a print job into sheetside bitmaps. The sheetside bitmaps generated by the interpreter module 212 for each primary color are each a 2-dimensional array of pels representing an image of the print job (e.g., a Continuous Tone Image or CTI), also referred to as full sheetside bitmaps. The 2-dimensional pel arrays are considered "full" sheetside bitmaps because the bitmaps include the entire set of pels for the image. The interpreter module 212 is operable to interpret or render multiple raw sheetsides concurrently so that the rate of rendering substantially matches the rate of imaging of production print engines. In one embodiment, transfer functions may be implemented by print controller 140 and applied directly to image data as a part of the image processing prior to printing. In that case, the contone image data (e.g., CTI data) is transformed by applying the transfer functions to the CTI data prior to halftoning. A transfer function comprises a mapping of an input digital count to an output digital count for a system, where digital count is the gray level or color value representing the pels in a bitmap 150 (FIG. 1). Transfer functions may be used for calibrating printing system 130.

Halftoning module 214 is operable to represent the sheetside bitmaps as halftone patterns of ink. For example, halftoning module 214 may convert the pels (also known as pixels) to halftone patterns of CMYK ink for application to the paper. A halftone design may comprise a pre-defined mapping of input pel gray levels to output drop sizes (e.g., instructed ink drop sizes transmitted to printheads) based on pel location.

In one embodiment, the halftone design may include a finite set of transition thresholds between a finite collection of successively larger drop sizes, beginning with zero and ending with a maximum drop size (e.g., zero, small, medium and/or large). The halftone design may be implemented as threshold arrays (e.g., halftone threshold arrays) such as single bit threshold arrays or multibit threshold arrays. In another embodiment, the halftone design may be implemented as a three-dimensional look-up table with all included gray level values.

In a further embodiment, halftoning module 214 performs the multi-bit halftoning using the halftone design including a set of threshold values for each pel in the sheetside bitmap, where there is one threshold for each non-zero ink drop size. The pel is halftoned with the drop size corresponding to threshold values for that pel. The set of thresholds for a halftone design is referred to as a multi-bit threshold array (MTA).

Multi-bit halftoning is a halftone screening operation in which the final result is a selection of a specific drop size available from an entire set of drop sizes that the print engine is capable of employing for printing. Drop size selection based on the contone value of a single pel is referred to as "Point Operation" halftoning. The drop size selection is based on the contone levels for each pel in the sheetside bitmap. This contrasts with "Neighborhood Operation" halftoning, where multiple pels in the vicinity of the pel being printed are used to determine the drop size. Examples of neighborhood operation halftoning include the well-known error diffusion method.

Multi-bit halftoning is an extension of binary halftoning, where binary halftoning may use a single threshold array combined with a logical operation to decide if a drop is printed based on the contone level for a pel. Binary halftoning uses one non-zero drop size plus a zero drop size (e.g., a drop size of none where no ink is ejected). Multi-bit halftoning extends the binary threshold array concept to more than one non-zero drop size.

Multi-bit halftoning may use multiple threshold arrays (e.g., multi-bit threshold arrays), one threshold array for each non-zero drop size. The point operation logic is also extended to a set of greater than, less than or equal to operations to determine the drop size by comparing the threshold or thresholds with image contone data for each pel. Multi-bit defines a power of two set of drop sizes (e.g., two-bit halftone designs have four total drops, including a zero drop size). While the power of two may be employed to define the number of drops, systems not following this such as a three total drop system may be used and are still considered multi-bit.

For multi-bit halftones, the MTA is a three-dimensional array including one two-dimensional array for each drop size (e.g., instructed ink drop size) transition. Thus, an MTA includes a set of two-dimensional arrays of thresholds for transition between drop sizes: a first plane (or plane 1) provides the threshold for the Large output level, while a second plane (or plane 2) and third plane (or plane 3) provide thresholds for the Medium and Small output levels respectively for a system having three drop sizes, not including zero drop size (none or Off). In other embodiments, different one-to-one relationships may be used since the correspondence between plane numbers and drop sizes is a matter of design choice.

To use these threshold arrays for halftoning, each multibit threshold array is tiled across the contone image data provided by the sheetside bitmap, which provides a set of threshold values for each pixel in the sheetside bit map. The contone image data (e.g., digital count, gray level data) is logically compared to the threshold data on a pixel basis. In the case of Large drops, they are produced by the halftoning when the image contone data is greater than the respective large threshold values in plane 1.

Medium drops are produced when the image contone data is greater than the medium drop plane 2 thresholds and the image contone data is less than or equal to the large drop thresholds in plane 1. Small drops are produced when the image contone data is greater than the small drop thresholds in plane 3 and the image contone data is less than or equal to the medium drop thresholds in plane 2.

Finally, the off/none drop size occurs for cases when the contone image data is less than or equal to the small drop thresholds in plane 3. In this embodiment of a two-bit multibit printing system, this set of four logical equations, used with thresholds from each plane of the multibit threshold array permit each printing drop size to be defined based on the contone values.

Alternate versions of the halftoning equations may also be defined. An example of an alternate set of halftoning logical expressions replaces the less than or equal to operation with less than and the greater than operation is replaced with greater than or equal too. A further variation uses the less than or equal to and greater than logical expressions starting with the test for the largest drop size first. If a drop size is not found the process continues with the logical expression for the next smallest drop size. If the sequential test for each drop size does not find a drop size, the none drop size is assumed. The threshold arrays for each different set of halftoning equations will vary and therefore the threshold array are generated assuming a given set of equations.

In other embodiments, the number of planes of threshold data can be extended to handle any number of drop sizes. The data of these two-dimensional arrays may be segmented into separate memory regions and stored in any convenient order. For example, the thresholds for each drop size transition may be stored contiguously in memory, and it is often advantageous to do so.

Compensation module 230 performs a compensation process on an un-compensated halftone 218, or previously generated uniformity compensated halftone, received at print controller 140 to generate one or more compensated halftones 220. A compensated halftone is a halftone that has been adjusted to achieve a target output response. Compensated halftones 220 are then received at halftoning module 214 along with the sheetside bitmap. In one embodiment, an un-compensated halftone 218 represents a reference halftone design that is modified to create the compensated halftones based on measurement OD data 501 and target OD data 502. In such an embodiment, measurements of the system response (e.g., measurement optical density (OD) data 501) are received via measurement module 190 using the un-compensated halftone 218 for printing the test chart.

Compensation module 230 may alternatively perform a compensation process to generate compensated transfer functions 225 based on measurement OD data 501 and target OD data 502. The measurement units for OD data 501 have the same units as target OD data 502. In such an embodiment, measurements of the system response (e.g., measurement optical density (OD) data 501) are received via measurement module 190 using compensated halftone 220 for printing the test chart. Compensated transfer functions 225 are then received at transfer function application module 235. Transfer function application module 235 applies the received compensation transfer functions 225 to print image data received from interpreter module 212 prior to performing halftoning at halftoning module 214. As mentioned above, a transfer function comprises a mapping of an input digital count (or tint) to an output digital count for a system, where digital count is the gray level or color value representing the pels in a bitmap 150 (FIG. 1). Transfer functions may be received or generated (e.g., generated based on target OD versus input digital count data and measured OD versus output digital count data).

Compensation module 230 is further implemented to perform a calibration process to maintain optical density (OD) within printer 160 in order to compensate for OD differences from a target OD. According to one embodiment, a calibrated print system is a print system that achieves a first target response while printing onto a first print substrate with a first halftone design and first printer transfer function. M1 is a measured response corresponding to a target print system printing on the first print substrate using the first halftone design and none or an identity transfer function (e.g., digital count output=digital count input). The measurements units for the measured response M1 have the same units as the target response T1. M2 is a measured response corresponding to a calibrated print system printing on the second print substrate using the first halftone design and the first printer transfer function. T2 is the second target response while printing onto a second print substrate with a first halftone design and the first printer transfer function. The measurements units for the measured response M2 have the same units as the target response T2.

Figure 3:
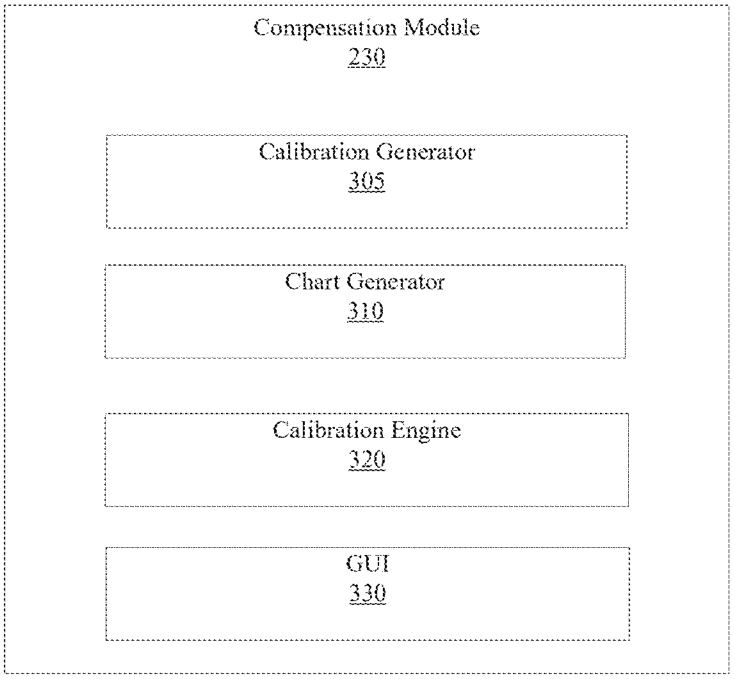
FIG. 3 illustrates one embodiment of compensation module.

FIG. 3 illustrates one embodiment of compensation module 230 including a calibration generator 305, chart generator 310 and calibration engine 320. Calibration generator 305 facilitates a calibration process at print system 130 by directing the calibration process. In one embodiment, the calibration process is performed to generate or update the print system (or printer) transfer function (e.g., for long term printer OD change compensation), print substrate transfer function and/or the composite transfer function (or composite printer transfer function). In such an embodiment, each calibration is based on a calibration performed using a print substrate (e.g., print medium or customer paper) to be implemented for print jobs at printing system 130. In a further embodiment, each calibration may be initiated by a system operator through a graphical user interface (GUI 330) in printing system 130.

As used herein, a printer transfer function (e.g., printerTF, a first printer transfer function) is a mapping of an input digital count to an output digital count for a print system to achieve the first target response (e.g., T1, reference ink deposition, Optical Density target) while printing on the first print substrate (e.g., S1 or a reference print substrate) with the first halftone design (e.g., a reference halftone design). When the printer transfer function is applied to the print system, the print system becomes a calibrated print system. A print substrate transfer function (e.g., substrateTF) is a mapping of an input digital count to an output digital count for a calibrated print system to achieve a second target response (e.g., T2) while printing onto a second print substrate (e.g., S2, a customer print substrate) with a first halftone design and the first printer transfer function. A composite transfer function (or CTF) is a transfer function that is the composite of the printer transfer function and the print substrate transfer function.

Chart generator 310 prints a test chart upon initiation of a calibration process. In one embodiment, chart generator 310 generates an image (e.g., print image for the test chart) that is subsequently processed by measurement module 190 to generate OD measurement data. In a further embodiment, first measurement data is generated that is associated with an image printed on paper during a first calibration process using an identity transfer function and an initial print substrate (e.g., a first print substrate). Similarly, second measurement data is generated by printing the image during a subsequent calibration process on a subsequent print substrate (e.g., a second print substrate) using a printer transfer function derived for the first print substrate. Third measurement data is generated by printing the image during a confirmation process on a subsequent print substrate using a printer transfer function and print substrate transfer function associated with that print substrate. In one embodiment, the print substrate used during a subsequent print substrate calibration may be the same or different than the initial print substrate.

Figure 4:
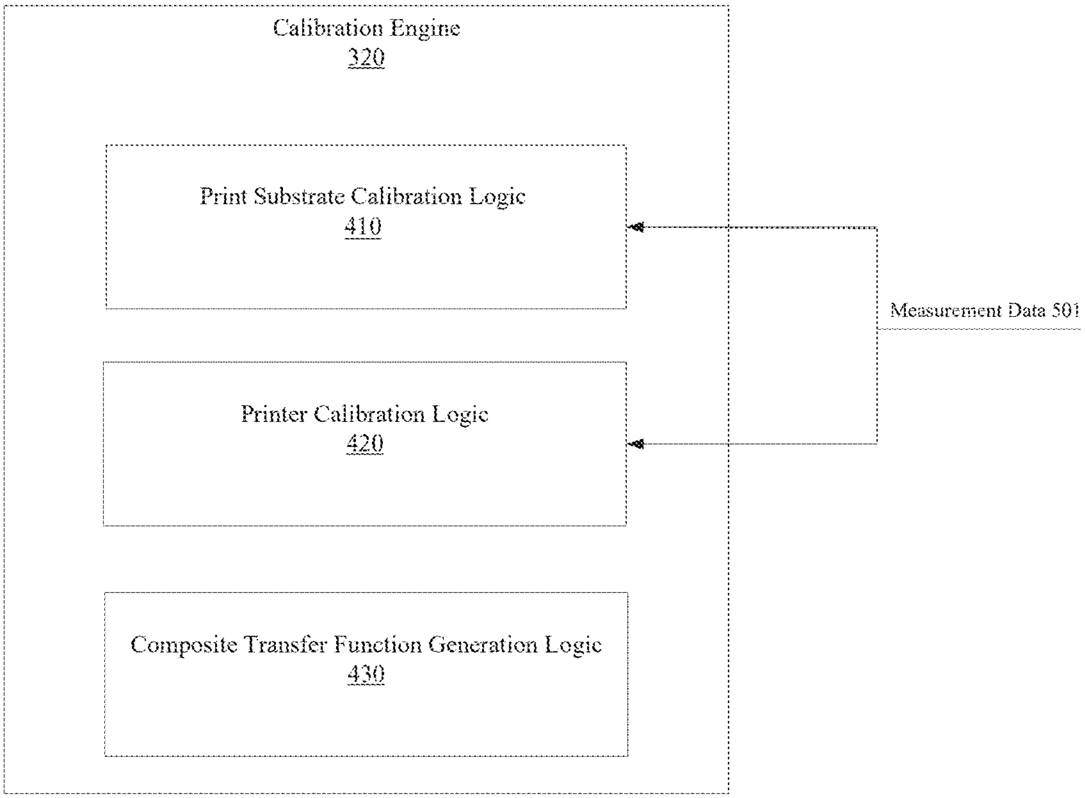
FIG. 4 illustrates one embodiment of calibration engine.

Calibration engine 320 receives the first and second measurement data and generates the print substrate transfer functions. In embodiments, the composite transfer functions (CTFs) are generated based on print substrate transfer functions and printer transfer functions. The third measurement data may be used to confirm the accuracy of the composite transfer function and print substrate transfer function. FIG. 4 illustrates one embodiment of calibration engine 320 including print substrate calibration logic 410, printer calibration logic 420. Print substrate calibration logic 410 receives measurement OD data 501.

Print substrate calibration logic 410 may be implemented to generate a print substrate transfer function for each customer paper that is to be used at printing system 130. Printer calibration logic 420 is implemented to generate a printer transfer function. Composite generation logic 430 generates composite transfer functions based on a mathematical function composition of a printer transfer functions and print substrate transfer functions.

In one embodiment, print substrate calibration logic 410 generates updated (or corrected) print substrate transfer functions to compensate for changes to the printer transfer function or changes to print substrate measured responses. In such an embodiment, print substrate calibration logic 410 first generates a first print substrate transfer function based on a current printer transfer function (e.g., PTF_k, where k represents an index of different printer transfer functions). Thus, PTF_k, is used to print a test chart on customer paper whose associated measurement data is used to determine a print substrate transfer function (e.g., substrateTF_i_j, where i is an index of different papers and j is index of repeat (e.g., iteration) print substrate transfer functions for the same paper).

In a further embodiment, print substrate calibration logic 410 generates the new print substrate transfer function (e.g., substrateTF_i_j+1) based on the updated printer transfer function (e.g., PTF_k+1). In this embodiment, print substrate calibration logic 410 generates substrateTF_i_j+1 employing measurements using PTF_k+1. The latest versions of PTF and substrateTF or the composite transfer function generated from the PTF and substrateTF are used for printing on the print substrate associated with substrateTF.

Figure 5:
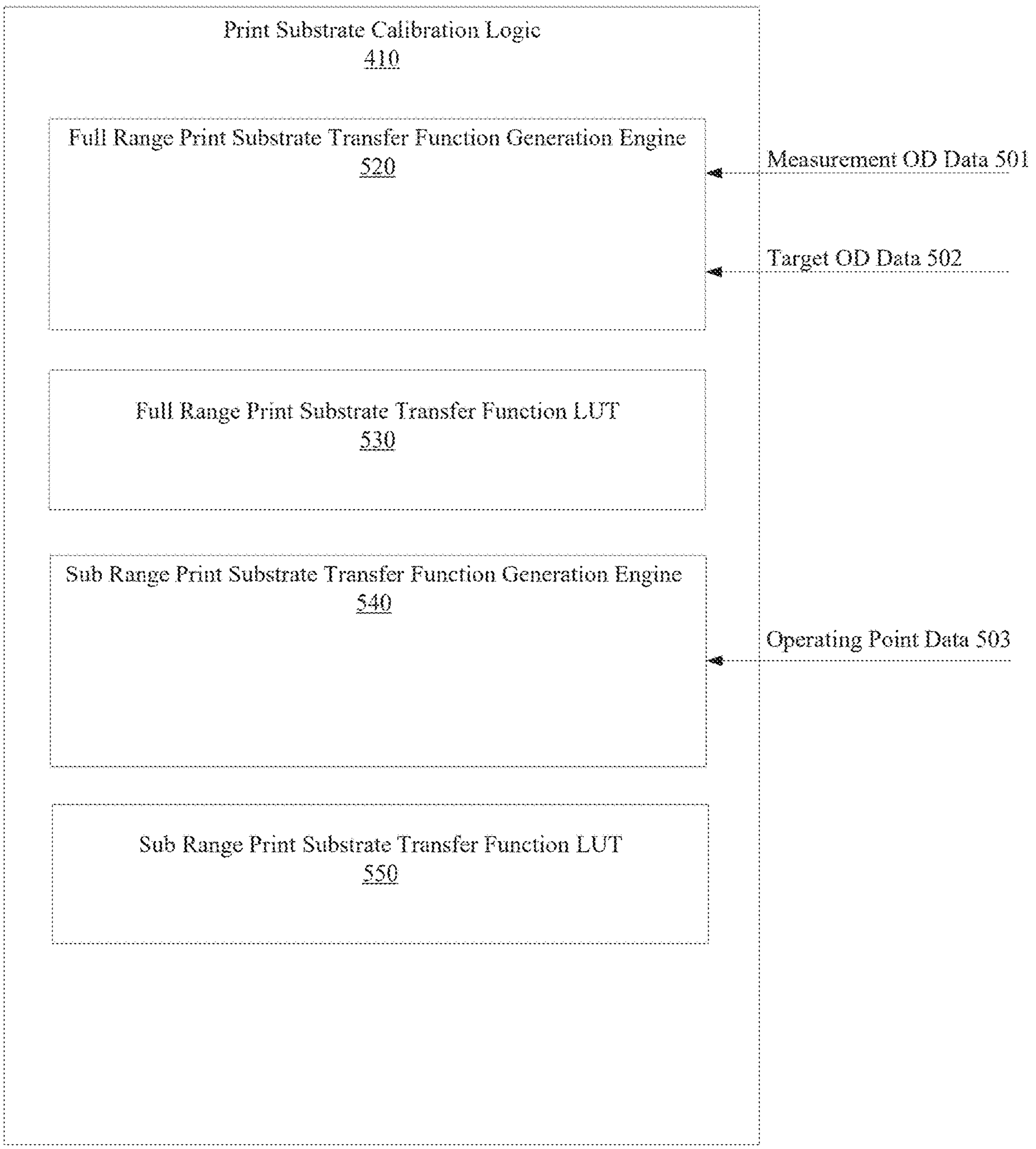
FIG. 5 illustrates one embodiment of print substrate calibration logic.

FIG. 5 illustrates one embodiment of print substrate calibration logic 410. As shown in FIG. 5, print substrate calibration logic 410 includes a full range print substrate transfer function generation engine 520 that receives measurement OD data 501 (associated with printing with a new customer paper and the printer transfer function) from measurement module 190 and target OD data 502. In one embodiment, full range print substrate transfer function generation engine 520 generates a full range print substrate transfer function based on the measurement OD data 501 with the printer transfer function used and the target OD data 502. As used herein, a full range transfer function comprises plurality of digital count values calibrated to achieve the maximum measured optical density for the substrate (e.g., the target is DDmax or a second optical density target) by an image processing system (e.g., printing system 130).

Figure 6:
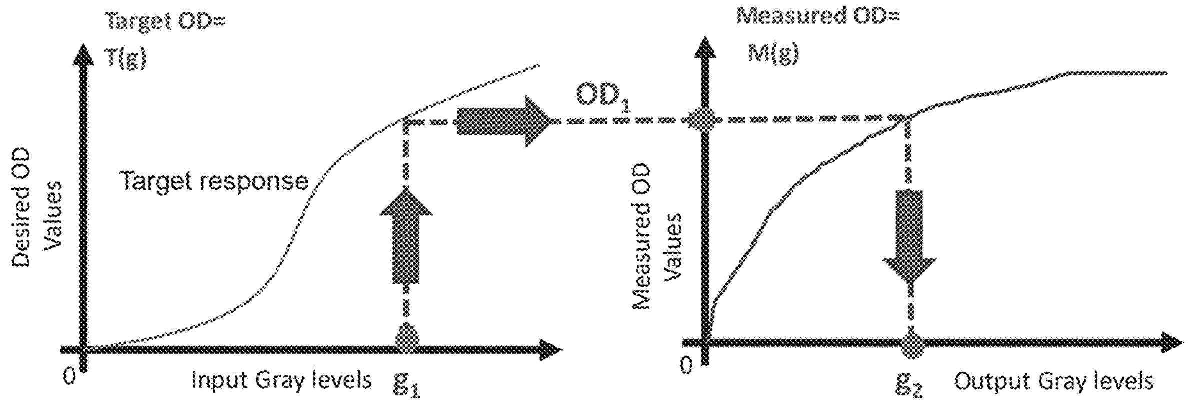
FIG. 6 illustrates one embodiment of a transfer function.

FIG. 6 illustrates one embodiment for generating a transfer function (e.g., a printer transfer function and/or a print substrate transfer function) for all digital count levels (e.g., gray levels). Target OD data T(g) (e.g., target OD data 502) is used as the objective for an applied current halftone with an identity transfer function or current halftone with applied current printer transfer function. The measured response is given by M(g) (e.g., measurement OD data 501). The measured response is determined by printing a single color corresponding to the ink. Given the known response, at gray level $g_1$ the target OD is $OD_1$. To achieve $OD_{1,}$, print level $g_2$ is printed. Using, for example, 0:255 for $g_1$ the set of $g_2$ values defines the transfer function. The transfer function represented as a continuous function defines: g_output=TF (g_input). The expression for the transfer function can be written in terms of the target T and inverse measured responses $M^{-1}$, such that:

$$g\_output = M^{-1}(T(g\_input)) = TF(g\_input)$$

Using g_output values as replacement values for the corresponding g_input values, the calibrated target response T is achieved for all levels. The transfer functions may be generated as a lookup table (e.g., LUT) or a mathematical curve. The transfer function curve may be generated though mathematical curve fitting (e.g., using cubic spline, smoothing spline curve or other known mathematical approximation techniques). Transfer function curves may then be evaluated with input values to determine output values by direct computation. A technical benefit of lookup tables (e.g., LUT 530 or LUT 550) is that evaluating a lookup table has reduced computational processing burden compared to often complex runtime calculations associated with evaluating curves.

Figure 7:
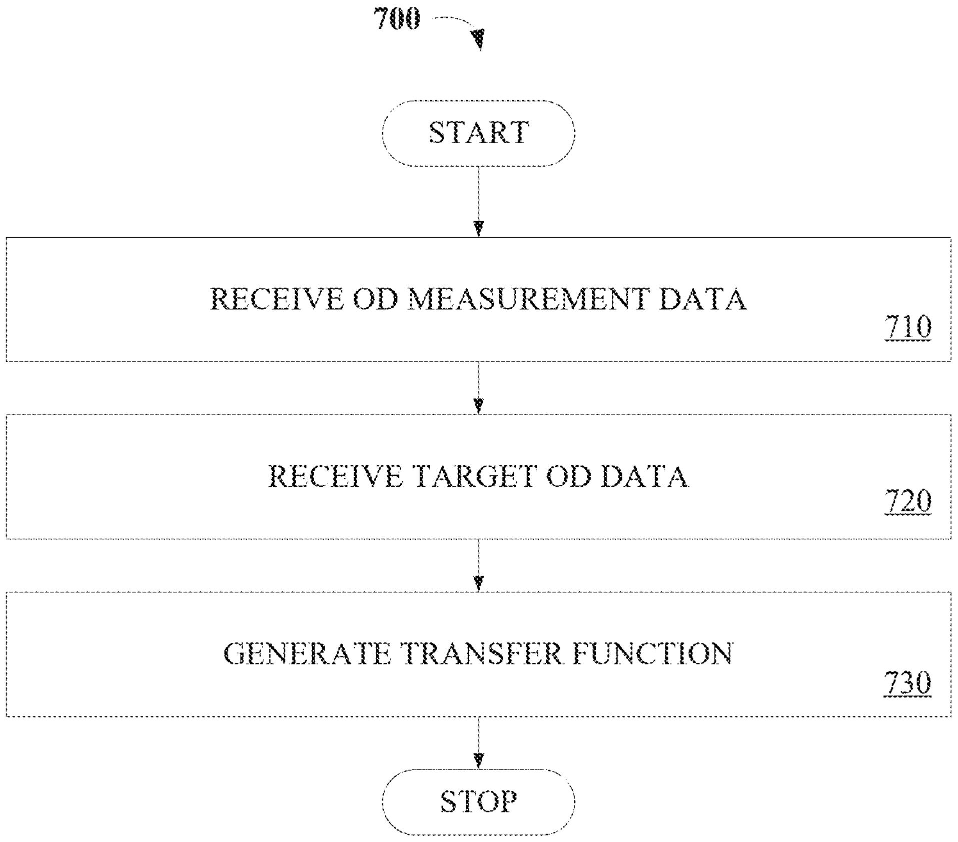
FIG. 7 is a flow diagram illustrating one embodiment of a process for generating a print substrate transfer function.

FIG. 7 is a flow diagram illustrating one embodiment of a process 700 for generating a transfer function (e.g., full range print substrate transfer function). Process 700 may be performed by processing logic that may include hardware (e.g., circuitry, dedicated logic, programmable logic, microcode, etc.), software such as instructions run on a processing device, or a combination thereof. In one embodiment, process 700 is performed by calibration engine 320.

Process 700 begins at processing block 710, where OD measurement data is received. At processing block 720, target OD data is received. At processing block 730, the transfer function is generated based on the measurement OD data 501 and target OD data 502. In one embodiment, processing block 730 generates full range print substrate transfer function FRsubstrateTF_i_j. Transfer functions (e.g., a LUT that represents the transfer function), the OD target associated with the transfer function, and/or the OD measurement data associated with the transfer function may be stored in system memory for later access.

Full range print substrate transfer function generation engine 520 may also generate full range print substrate transfer functions associated with a different print substrate (e.g., FRsubstrateTF_i+1_j) using new test data for the print substrate according to process 700 using the corresponding measurement OD data 501 and DDmax target OD data 502 for the new substrate.

According to one embodiment, the above-described process is implemented to generate a full range print substrate transfer function lookup table (LUT) 530 (shown in FIG. 5) including full range print substrate transfer functions (FRsubstrateTF_i_j) associated with each digital count for each color plane. In a further embodiment, LUT 530 also includes a plurality of operating point parameters, including OD, ΔE, percent dot (PD) knockdown, etc. As used herein, ΔE is a metric that indicates how perceptible a change between two different CIELAB colors is, while PD knockdown is the percent dot reduction from the 100% tint level. For example, a 10% PD knockdown reduces the tint level to 90%. FIG. 8 illustrates one embodiment of full range print substrate transfer function LUT 530 for a black (K) color plane and associated parameters. For the embodiment shown in FIG. 8, full range print substrate transfer functions shown in the rightmost column uses 14 bits (0,16383), digital count DC input values in the leftmost column are 8 bit (0,255), L*,a*,b* in the second, third and fourth columns are CIE LAB, PD is percent dot knockdown (0,100), and DE 2000 is Delta E 2000. Optical Density OD is provided in the next to the last column. Each of the values in a single row are associated with the respective DC level in the first column. This example shows values for light tints from DC levels 0 to 18.

Referring back to FIG. 5, print substrate calibration logic 410 also includes sub range print substrate transfer function generation engine 540. In one embodiment, sub range print substrate transfer function generation engine 540 receives the operating point data, receives a full range transfer function (e.g., full range print substrate transfer function) corresponding to an image processing system and generates a sub range transfer function (e.g., sub range print substrate transfer function) corresponding to the image processing system for each of a plurality of digital count values based on the operating point data and the full range transfer function. A resulting technical benefit is that the sub range transfer function for a new operating point may be generated without obtaining new measurement OD data 501 which saves operator time and/or reduced system burden. Other data such as DDmax and DDmin (as explained below) may also be received as needed. In a further embodiment, the input domain of the sub range transfer function matches the input domain of the full range substrate transfer function, and the maximum value of the output range of the sub range transfer function is smaller than the maximum value of the output range of the full range transfer function.

Matching domains or ranges may be accomplished with appropriate selection of data points or with mathematical approximations. Typically, if the full range transfer function is a continuous function, then approximations are not needed. If the full range transfer function is discrete, then an approximation may be needed. A resulting technical benefit of matching input domains or ranges in that embodiment is to ensure continuity when applying the sub range transfer function in the image processing system. In yet a further embodiment employing composite transfer functions and substrate transfer functions, the input domain of the sub range transfer function matches the range of contone levels in the image processing system, and an output range of the sub range transfer function matches a domain of the full range printer transfer function. Furthermore, the output range of the sub range printer transfer function matches the domain of the halftone thresholds of the image processing system.

As used herein, a sub range transfer function comprises a plurality of digital count values calibrated to an optical density target value (e.g., a first optical density target value) indicated by the operating point data 503, wherein the first optical density target value indicated by the operating point data 503 is less than the DDmax value (e.g., the largest possible optical density target value based on measured values). A resulting technical benefit for a full range transfer function calibrated to a maximum calibration optical density target (e.g., DDmax or the second optical density value) is that such a full range transfer function contains the data needed for generating a sub range transfer function calibrated to any optical density target that is less than the maximum calibration optical density, as explained further below.

In one embodiment, sub range print substrate transfer function generation engine 540 receives full range print substrate transfer functions from full range print substrate transfer function LUT 530 and the operating point data 503 from GUI 330. In such an embodiment, GUI 330 displays the operating parameters stored in LUT 530. Where the LUT 530 contains the operating parameters: uncalibrated OD values vs Digital Count (DC) from the OD column, Delta E 2000 vs DC from the DE 2000 column, and percent dot knockdown vs DC from the PD knockdown column. The DDmax OD value is obtained from the OD values at DC level 255. The DDmin OD value (e.g., paper OD) is obtained from the OD values at DC level 0. CIELAB L*, a* and b* values are also included for reference. Uncalibrated OD response is plotted vs percent dot. In a further embodiment, a system operator (or user) reviews the displayed plurality of options (e.g., operating parameters) to select operating point data that achieves the desired results on a substrate based on OD values, color differences, PD and additional data obtained independently which is not displayed such as ink drying capability and ink usage. A technical benefit resulting from displaying the plurality of options includes common logic for accepting different selections from the plurality of options.

Figure 9:
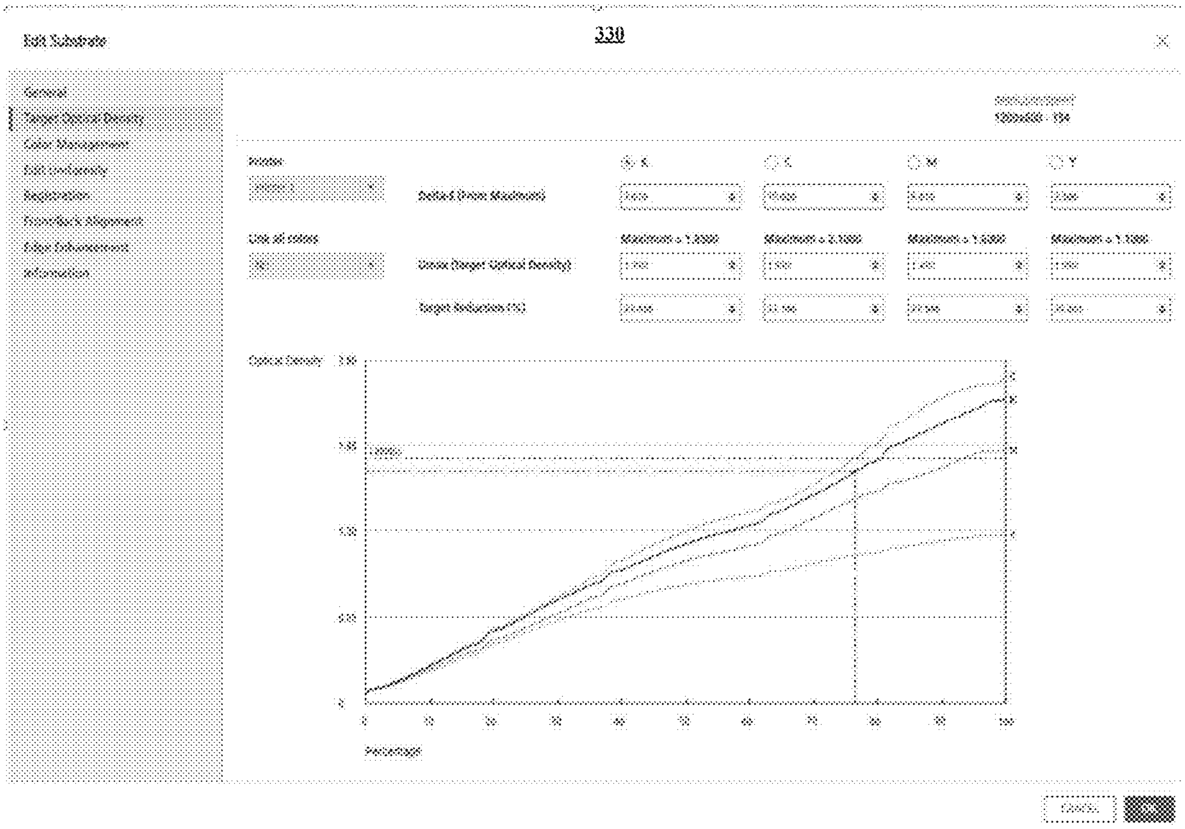
FIG. 9 illustrates one embodiment of a graphical user interface.

FIG. 9 illustrates one embodiment of GUI 330. As shown in FIG. 9, the user may select or input one of the three operating point data values: 1) an updated target OD (Dmax) value that is less than or equal to DDmax. Recommended maximum Dmax target values are shown in bold prefaced with "Maximum="; 2) PD knockdown labeled "Target Reduction"; or 3) Delta E labeled "Delta-E (From Maximum)". Compensation module 230 may convert operating point parameters from one type to another (e.g., from/to OD, PD knockdown, Delta E, etc.) using known conventional image processing methods (e.g., a look up table containing the relationships between the operating point parameters with interpolation) with a resulting technical benefit of enabling the input of a plurality of operating point parameter types. In one embodiment, the other two values are also displayed using the data from the LUT for a user defined value. In a further embodiment, options are available to link the selections for different color planes to avoid having to separately define each color plane. In yet a further embodiment, the user may employ the displayed information along with additional data obtained independently which is not displayed such as ink drying capability and ink usage to tradeoff PQ parameters to make a final operating point decision.

The Dmax target value, the DDmax value and a minimum substrate OD (DDmin or minimum optical density) value associated with the selection is employed to determine a digital count value (DC_1). In one embodiment, the DDmin value comprises an optical density value associated with an unprinted area of the print substrate (e.g., paper white OD at DC level 0), while DDmax value comprises an optical density of a printed area of the print substrate (e.g., printing by applying the maximum digital count such as DC=255 to the printing). Thus, DDmax is the highest OD achievable using the full range TF and DDmin is the paper white OD. DC_1 is the value that when used as an input to the Full Range TF, achieves the target Dmax and is given by:

$$DC\_1=(((2^{\wedge}\text{bitdepth})-1)*(D\text{max}-DD\text{min}))/(DD\text{max}-DD\text{min}),$$

where DC_1 is a float having domain (0, ((2^bitdepth)−1)) and bitdepth is the input bit depth for the full range TF.

A sub range print substrate transfer function (SRsubstrateTF_i_j_k) is generated that produces a linear OD from DDmin to Dmax, given by:

SRsubstrateTF_i_j_k(DC)=FRsubstrateTF_i_j (DC_1*DC/((2^bitdepth)−1)), where k is the index for sub TF having different Dmax target values for the same substrate, i is index for different substrates and j is the index for different iterations for the full range transfer function (FRsubstrateTF_i_j(DC)). DC is the digital count input value for the full range transfer function and DC_1 is the value previously described to achieve a given Dmax target value.

As a result, the sub range print substrate transfer function may be generated for each DC value (e.g., 0-255 for an DC system that has a bit depth of 8 bits) employing the DC_1 value and full range bitdepth. The DC_1 value is generated based on the Dmax target, DDmax (e.g., the second optical density target value) and the minimum optical density value (e.g., DDmin) of the imaging system. A resulting technical benefit for generating a sub range transfer function based on the minimum optical density value of the imaging system is that such a sub range transfer function provides a calibration range that includes the minimum optical density value (e.g., unprinted paper white). According to one embodiment, sub range print substrate transfer function generation engine 540 generates a sub range print substrate transfer function lookup table (LUT) 550 (shown in FIG. 5) including sub range print substrate transfer functions (SRsubstrateTF_i_j_k) associated with each digital count for each color plane of the image processing system.

In practice the sub range print substrate transfer function is derived using the equations provided to achieve a specific Dmax target using the full range print transfer function values in the last column of LUT 530. Similarly employing PD knockdown values or Delta E one can with interpolation obtain the associated DC value in the first column which corresponds to DC_1 for these cases. Once the DC_1 value is determined for the desired knockdown or delta E the sub range print substrate transfer function can be computed based on the provided equations using the discrete full range transfer function in the last column to define a discrete FRsubstrateTF_i_j(DC). Since this uses a discrete transfer function representation, interpolation or another similar method is used to compute the output values for each DC for the sub range print substrate transfer function. The sub range print substrate transfer functions for each color plane may be different from each other because the full range substrate transfer function, DDmax and DDmin may be different for each color plane. A resulting technical benefit for generating a sub range print substrate transfer function for each color plane is improved density control when printing each color plane with the corresponding sub range print substrate transfer function for each of the color planes.

Figure 10:
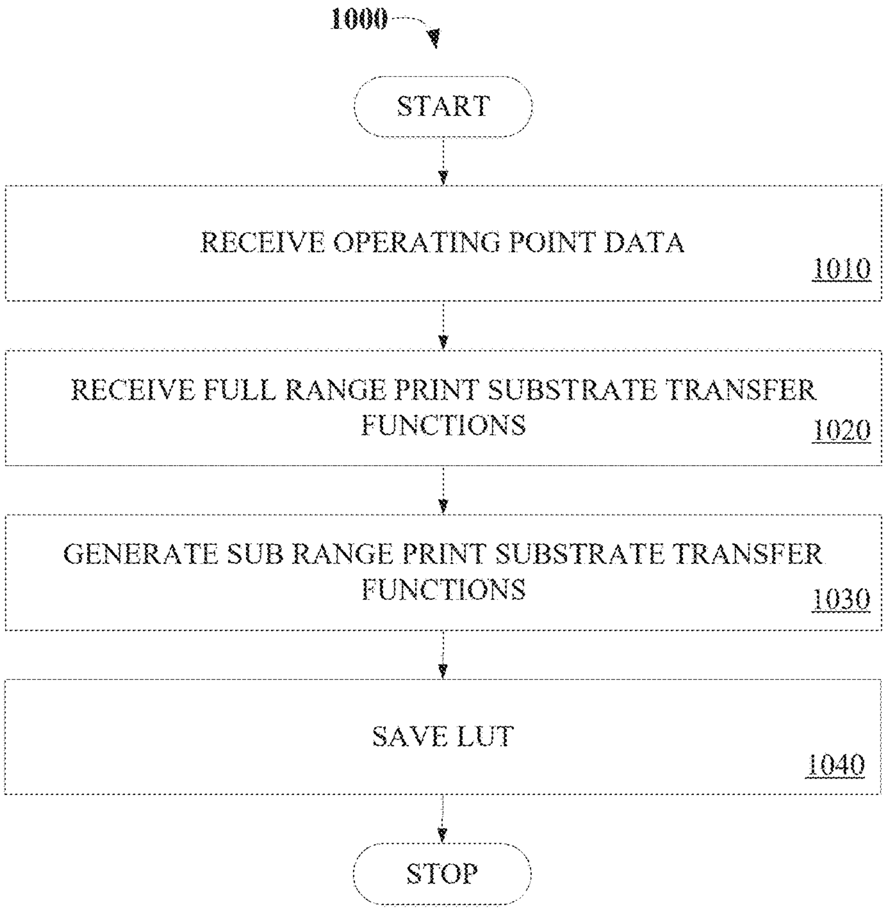
FIG. 10 is a flow diagram illustrating one embodiment of a process for generating a sub range transfer function.

FIG. 10 is a flow diagram illustrating one embodiment of a process 1000 for generating a sub range print substrate transfer function. Process 1000 for generating a printer transfer function and a print substrate transfer function has been previously described. Process 1000 may be performed by processing logic that may include hardware (e.g., circuitry, dedicated logic, programmable logic, microcode, etc.), software such as instructions run on a processing device, or a combination thereof. In one embodiment, process 1000 is performed by sub range print substrate transfer function generation engine 540.

Process 1000 begins at processing block 1010 where the operating point data 503 is received from GUI 330. At processing block 1020, full range print substrate transfer functions are received (e.g., from memory, from full range print substrate transfer function generation engine 520 and/or from external to compensation module 230). At processing block 1030, sub range print substrate transfer functions are generated based on the operating point data 503 and the full range print substrate transfer functions. At processing block 1040, the sub range print substrate transfer functions are saved in sub range print substrate transfer function LUT 550.

According to one embodiment, sub range print substrate transfer functions are implemented to generate the CTFs. Referring back to FIG. 4, printer calibration logic 420 is implemented to generate a printer transfer function, while composite generation logic 430 generates CTFs based on a mathematical function composition of a printer transfer functions and print substrate transfer functions. The CTFs are subsequently transmitted to transfer function application module 235 in the form of a LUT 237 (FIG. 2A) to be applied to a CTI data.

In one embodiment, the range of a sub range print substrate transfer equals the domain of the printer transfer function as previously described. Based on the above, composite transfer function generation logic 430 generates CTF values via a discrete composite transfer function.

Although described above as being implemented as print substrate transfer functions, sub range transfer functions may be implemented in other applications. For example, sub range transfer functions may be used for sensor application. In an electro-optical sensor application having current vs DC utilizing sub range transfer functions may be used to provide different levels of sensor calibration. In this case, DDmax corresponds to the maximum measured current and DDmin corresponds to the minimum (e.g., dark) current. The measured sensor current response is analogous to the measured OD response on the substrate and the target current response is analogous to the full range target OD. A full range TF computed from these measured and the full range target responses may provide the calibrated response to the maximum possible current at the highest DC level. Sub transfer functions based on the full range TF may then be used to provide variations to the sensor calibration with reduced range of maximum currents. In this case, the Dmax target would correspond to the target reduced maximum current level.

Figure 11:
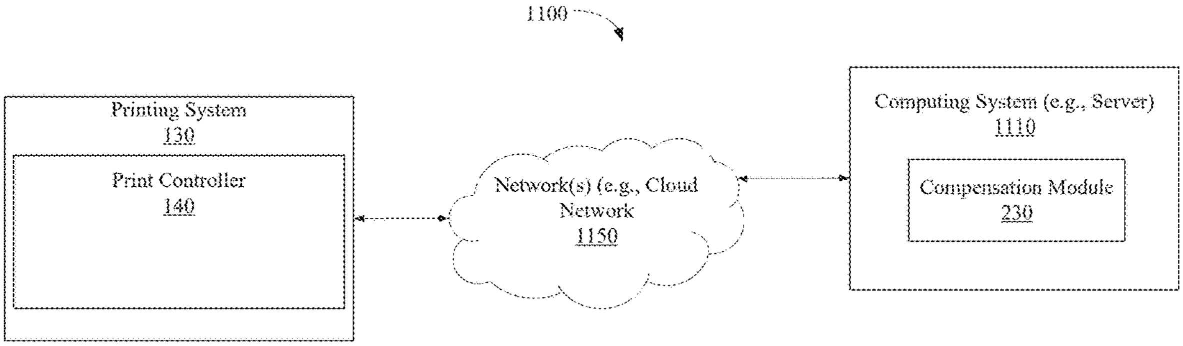
FIG. 11 illustrates one embodiment of a compensation module implemented in a network.

Although shown as a component of print controller 140, other embodiments may feature compensation module 230 included within an independent device communicably coupled to print controller 140. For instance, FIG. 11 illustrates one embodiment of compensation module 230 implemented in a network 1100. As shown in FIG. 11, compensation module 230 is included within a computing system 1110 and communicates with printing system 130 via a cloud network 1150.

Figure 12:
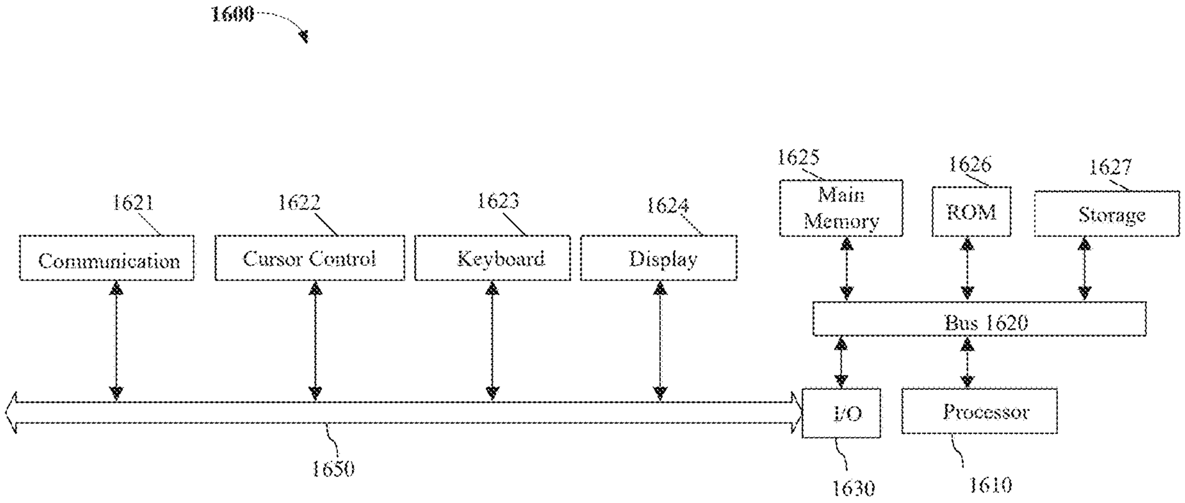
FIG. 12 illustrates one embodiment of a computer system.

FIG. 12 illustrates a computer system 1600 on which printing system 130, print controller 140 and compensation module 230 may be implemented. Computer system 1600 includes a system bus 1620 for communicating information, and a processor 1610 coupled to bus 1620 for processing information.

Computer system 1600 further comprises a random-access memory (RAM) or other dynamic storage device 1625 (referred to herein as main memory), coupled to bus 1620 for storing information and instructions to be executed by processor 1610. Main memory 1625 also may be used for storing temporary variables or other intermediate information during execution of instructions by processor 1610. Computer system 1600 also may include a read only memory (ROM) and or other static storage device 1626 coupled to bus 1620 for storing static information and instructions used by processor 1610.

A data storage device 1627 such as a magnetic disk or optical disc and its corresponding drive may also be coupled to computer system 1600 for storing information and instructions. Computer system 1600 can also be coupled to a second I/O bus 1650 via an I/O interface 1630. A plurality of I/O devices may be coupled to I/O bus 1650, including a display device 1624, an input device (e.g., an alphanumeric input device 1623 and or a cursor control device 1622). The communication device 1621 is for accessing other computers (servers or clients). The communication device 1621 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein.

Some embodiments pertain to Example 1 that includes a system comprising at least one physical memory device to store calibration logic and one or more processors coupled with the at least one physical memory device to execute the calibration logic to receive operating point data corresponding to an image processing system, receive a full range transfer function corresponding to an image processing system and generate a sub range transfer function corresponding to the image processing system for each of a plurality of digital count values based on the operating point data and the full range transfer function.

Example 2 includes the subject matter of Example 1, wherein the sub range transfer function comprises a plurality of digital count values calibrated to a first optical density target value indicated by the operating point data.

Example 3 includes the subject matter of Examples 1 and 2, wherein the full range transfer function comprises a plurality of digital count values calibrated to a second optical density target value which is greater than the first optical density target value.

Example 4 includes the subject matter of Examples 1-3, wherein the second optical density target value comprises a maximum calibration optical density of the image processing system.

Example 5 includes the subject matter of Examples 1-4, wherein the sub range transfer function is further generated for each of the plurality of digital count values based on the second optical density target value and a minimum optical density value of the image processing system.

Example 6 includes the subject matter of Examples 1-5, wherein the minimum optical density value comprises an optical density value associated with an unprinted area of a print substrate and the maximum optical density value comprises an optical density associated with a printed area of the print substrate; and wherein the print substrate corresponds to the image processing system.

Example 7 includes the subject matter of Examples 1-6, wherein the sub range transfer function comprises a first look up table and the full transfer function comprises a second lookup table.

Example 8 includes the subject matter of Examples 1-7, wherein the at least one physical memory device to store a graphical user interface (GUI) and the one or more processors coupled with the at least one physical memory device to execute the graphical user interface to display a plurality of options for selecting the operating point data.

Example 9 includes the subject matter of Examples 1-8, wherein the calibration logic receives the operating point data from the GUI.

Example 10 includes the subject matter of Examples 1-9, further comprising one or more print engines.

Example 11 includes the subject matter of Examples 1-10, wherein an input domain of the sub range transfer function matches an input domain of the full range transfer function, and the maximum value of the output range of the sub range transfer function is smaller than the maximum value of the output range of the full range transfer function.

Example 12 includes the subject matter of Examples 1-11, wherein an input domain of the sub range transfer function matches a range of contone levels in an imaging path, and the output range of the sub range transfer function matches the domain of the printer transfer function.

Some embodiments pertain to Example 13 that includes at least one computer readable medium having instructions stored thereon, which when executed by one or more processors, cause the processors to receive operating point data corresponding to an image processing system, receive a full range transfer function corresponding to an image processing system and generate a sub range transfer function corresponding to the image processing system for each of a plurality of digital count values based on the operating point data and the full range transfer function.

Example 14 includes the subject matter of Example 13, wherein the sub range transfer function comprises a plurality of digital count values calibrated to a first optical density target value indicated by the operating point data and the full range transfer function comprises a plurality of digital count values calibrated to a second optical density target value greater than the first optical density target value.

Example 15 includes the subject matter of Examples 13 and 14, wherein the sub range transfer function is further generated for each of the plurality of digital count values based on the second optical density target value and a minimum optical density value of the image processing system.

Example 16 includes the subject matter of Examples 1-15, wherein the minimum optical density value comprises an optical density value associated with an unprinted area of a print substrate and an maximum optical density value comprises an optical density associated with a printed area of the print substrate; and wherein the print substrate corresponds to the image processing system.

Some embodiments pertain to Example 17 that includes a method comprising receiving operating point data corresponding to an image processing system, receiving a full range transfer function corresponding to an image processing system and generating a sub range transfer function corresponding to the image processing system for each of a plurality of digital count values based on the operating point data and the full range transfer function.

Example 18 includes the subject matter of Example 17, wherein the sub range transfer function comprises a plurality of digital count values calibrated to a first optical density target value indicated by the operating point data and the full range transfer function comprises a plurality of digital count values calibrated to a second optical density target value greater than the first optical density target value.

Example 19 includes the subject matter of Examples 17 and 18, wherein the sub range transfer function is further generated for each of the plurality of digital count values based on the second optical density target value and a minimum optical density value of the image processing system.

Example 20 includes the subject matter of Examples 1-19, wherein the minimum optical density value comprises an optical density value associated with an unprinted area of a print substrate and an maximum optical density value comprises an optical density associated with a printed area of the print substrate; and wherein the print substrate corresponds to the image processing system.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A system comprising:

at least one physical memory device to store calibration logic; and one or more processors coupled with the at least one physical memory device to execute the calibration logic to:

receive operating point data corresponding to an image processing system;

receive a full range transfer function corresponding to the image processing system; and generate a sub range transfer function corresponding to the image processing system for each of a plurality of digital count values based on the operating point data and the full range transfer function, wherein the sub range transfer function comprises a plurality of digital count values calibrated to a first optical density target value indicated by the operating point data and a transfer function is applied to image data during printing of the image data.

2. The system of claim 1, wherein a digital count value comprises a color value representing a pel in a bitmap.

3. The system of claim 2, wherein the full range transfer function comprises a plurality of digital count values calibrated to a second optical density target value greater than the first optical density target value.

4. The system of claim 3, wherein the second optical density target value comprises a maximum calibration optical density of the image processing system.

5. The system of claim 4, wherein the sub range transfer function is further generated for each of the plurality of digital count values based on the second optical density target value and a minimum optical density value of the image processing system.

6. The system of claim 5, wherein the minimum optical density value comprises an optical density value associated with an unprinted area of a print substrate and the maximum optical density value comprises an optical density associated with a printed area of the print substrate; and wherein the print substrate corresponds to the image processing system.

7. The system of claim 1, wherein the sub range transfer function comprises a first look up table and the full transfer function comprises a second lookup table.

8. The system of claim 1, wherein the at least one physical memory device to store a graphical user interface (GUI) and the one or more processors coupled with the at least one physical memory device to execute the graphical user interface to display a plurality of options for selecting the operating point data.

9. The system of claim 8, wherein the calibration logic receives the operating point data from the GUI.

10. The system of claim 1, further comprising one or more print engines.

11. The system of claim 1, wherein an input domain of the sub range transfer function matches an input domain of the full range transfer function, and a maximum value of an output range of the sub range transfer function is smaller than a maximum value of an output range of the full range transfer function.

12. The system of claim 1, wherein an input domain of the sub range transfer function matches a range of contone levels in the image processing system, and an output range of the sub range transfer function matches a domain of the full range transfer function.

13. At least one non-transitory computer readable medium having instructions stored thereon, which when executed by one or more processors, cause the processors to:

receive operating point data corresponding to an image processing system;

receive a full range transfer function corresponding to the image processing system; and generate a sub range transfer function corresponding to the image processing system for each of a plurality of digital count values based on the operating point data and the full range transfer function, wherein the sub range transfer function comprises a plurality of digital count values calibrated to a first optical density target value indicated by the operating point data and a transfer function is applied to image data during printing of the image data.

14. The computer readable medium of claim 13, wherein the operating point data is received from a graphical user interface (GUI).

15. The computer readable medium of claim 14, wherein the sub range transfer function is further generated for each of the plurality of digital count values based on a second optical density target value and a minimum optical density value of the image processing system.

16. The computer readable medium of claim 15, wherein the minimum optical density value comprises an optical density value associated with an unprinted area of a print substrate and a maximum optical density value comprises an optical density associated with a printed area of the print substrate; and wherein the print substrate corresponds to the image processing system.

17. A method comprising:

receiving operating point data corresponding to an image processing system;

receiving a full range transfer function corresponding to the image processing system; and generating a sub range transfer function corresponding to the image processing system for each of a plurality of digital count values based on the operating point data and the full range transfer function, wherein the sub range transfer function comprises a plurality of digital count values calibrated to a first optical density target value indicated by the operating point data and a transfer function is applied to image data during printing of the image data.

18. The method of claim 17, wherein the operating point data is received from a graphical user interface (GUI).

19. The method of claim 18, wherein the sub range transfer function is further generated for each of the plurality of digital count values based on a second optical density target value and a minimum optical density value of the image processing system.

20. The method of claim 19, wherein the minimum optical density value comprises an optical density value associated with an unprinted area of a print substrate and a maximum optical density value comprises an optical density associated with a printed area of the print substrate; and wherein the print substrate corresponds to the image processing system.

* * * * *